United States Patent
Ng et al.

(10) Patent No.: US 9,657,116 B2
(45) Date of Patent: May 23, 2017

(54) PROCESS OF POLYOLEFIN FUNCTIONALIZATION

(71) Applicant: ExxonMobil Chemical Patents Inc., Baytown, TX (US)

(72) Inventors: Man Kit Ng, Basking Ridge, NJ (US); David T. Ferrughelli, Flemington, NJ (US); Hong Cheng, Bridgewater, NJ (US); Emmanuel Ulysse, Maplewood, NJ (US); Donna J. Crowther, Seabrook, TX (US); Edward A. Lemon, Jr., Swedesboro, NJ (US); Patrick Brant, Seabrook, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/900,989

(22) PCT Filed: Jun. 30, 2014

(86) PCT No.: PCT/US2014/044872
§ 371 (c)(1),
(2) Date: Dec. 22, 2015

(87) PCT Pub. No.: WO2015/041737
PCT Pub. Date: Mar. 26, 2015

(65) Prior Publication Data
US 2016/0152740 A1      Jun. 2, 2016

Related U.S. Application Data

(60) Provisional application No. 61/881,284, filed on Sep. 23, 2013.

(51) Int. Cl.
*C08F 8/46* (2006.01)
(52) U.S. Cl.
CPC ............ *C08F 8/46* (2013.01); *C08F 2810/30* (2013.01); *C08F 2810/40* (2013.01)
(58) Field of Classification Search
CPC ...................................................... C08F 8/46
USPC ........................................................ 549/233
See application file for complete search history.

(56) References Cited

U.S. PATENT DOCUMENTS

| | | |
|---|---|---|
| 5,032,460 A | 7/1991 | Kantner et al. |
| 5,079,298 A | 1/1992 | Kuriyama et al. |
| 5,468,477 A | 11/1995 | Kumar et al. |
| 5,616,153 A | 4/1997 | Mike et al. |
| 7,183,359 B2 | 2/2007 | Hanna et al. |
| 2003/0032727 A1 | 2/2003 | Narayan-Sarathy et al. |
| 2009/0318646 A1 | 12/2009 | Brant et al. |
| 2010/0170829 A1 | 7/2010 | Ng et al. |

FOREIGN PATENT DOCUMENTS

WO     2009/058079     5/2009

OTHER PUBLICATIONS

U.S. Appl. No. 13/804,507, filed Mar. 14, 2013, Ng et al.
U.S. Appl. No. 13/804,727, filed Mar. 14, 2013, Yaganeh et al.
Mulhaupt et al., "Novel Polypropene Materials Derived from Vinylidene-terminated Oligopropenes," Polymers for Advanced Technologiesm (1992) vol. 4, pp. 439-339.
Mulhaupt et al., "Reactive Blending of Polypropylene/Polyamide-6 in the Presence of Tailor-made Succinic Anhydride-terminated Oligopropene Compatibilizers," (1992) vol. 4, pp. 465-474.
Sainath et al., "Synthesis and Characteristics of Succinic Anhydride- and Disodium Succinate-Terminated Low Molecular Weight Polyethylenes," (2009) vol. 42, pp. 4356-4358.
Thompson et al., "Terminal functionalization of polypropylene via the Alder Ene reaction," (1998) vol. 39, pp. 327-334.

*Primary Examiner* — Taofiq A Solola
(74) *Attorney, Agent, or Firm* — Kevin M. Faulkner; Katherine L. Jackson

(57) ABSTRACT

Disclosed is a method of functionalizing a vinyl terminated polyolefin, the method comprising combining a vinyl terminated polyolefin and a α,β-unsaturated carbonyl compound at a temperature of at least 150° C. and a pressure of at least 14 psi, forming a functionalized polyolefin. The functionalized polyolefin comprises a compound or mixture of compounds represented the formula:

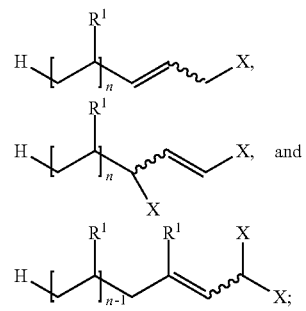

wherein each $R^1$ is, independently, selected from hydrogen and $C_1$ to $C_4$ or $C_{10}$ alkyls; n is an integer from 2 to 800; and each X is, independently, a functional group derived from the α,β-unsaturated carbonyl compound.

9 Claims, No Drawings

PROCESS OF POLYOLEFIN FUNCTIONALIZATION

PRIORITY CLAIM TO RELATED APPLICATIONS

This present application is a National Stage Application of International Application No. PCT/US2014/044872, filed Jun. 30, 2014, which claims priority to U.S. Ser. No. 61/881,284 filed Sep. 23, 2013, both of which are incorporated by reference.

FIELD OF THE INVENTION

The present invention relates in general to a method to modify vinyl terminated polyolefins, and in particular, improving the functionalization of vinyl terminated polyolefins with α,β-unsaturated carbonyl compounds and the resulting functionalized polymers.

BACKGROUND

The inventors have found that the thermal functionalization, especially maleation reaction, of vinyl terminated propylene-based homopolymer (and copolymer of propylene with higher alpha olefins such as 1-butene and 1-hexene) exhibits slower kinetics than that of vinylidene-terminated polyisobutylene of comparable number average molecular weights (Mn) in the range of about 500 to 3000 g/mol. For example, commercial highly reactive PIB (Mn 750 g/mol, vinylidene terminated, about 83-87%) undergoes maleation in the presence of 1.6 equivalent of maleic anhydride (MA) at 190° C. under about 1 atmospheric pressure (glassware conditions) for about 2 hours to afford a PIB-SA material with about 1.11 succinic anhydride functionality per polymer chain (e.g., see Example 1 below). In comparison, vinyl-terminated atactic polypropylene (aPP) of Mn about 1000 g/mol only gave a PP-SA material with less than 0.21 succinic anhydride functionality per polymer after 2 hours at 200° C. at about 120-140 psi of nitrogen when 2 equivalents of MA was used in autoclave (see, for example, Example 6 below). Consequently, long reaction times (between 30 to 80 hours) and/or large excess maleic anhydride are typically needed for achieving high conversion of the vinyl at temperature of 190° C. or below.

It is not understood why the rate of maleation of vinyl-terminated PP is so inefficient and it is unexpected that it should be slow. The lower reactivity of the vinyl double bond versus the vinylidene double bond may be rationalized in terms of the relative reactivity steric hindrance of the allylic hydrogens when the six-membered-like cyclic transition state is adopted by the two reactants (three methyl hydrogens in vinylidene versus two internal methylene hydrogens in vinyl). A technological need therefore exists for identifying a practical method with conditions that would provide high degree of functionalization of vinyl double bond with anhydride group toward thermal "ene" reaction (with maleic anhydride or other olefinically unsaturated carboxylic acid derivatives).

Related disclosures include U.S. Ser. No. 13/804,727 filed Mar. 14, 2013; U.S. Ser. No. 13/804,507 filed Mar. 14, 2013; US 2010-0170829; US 2009-0318646; U.S. Pat. No. 7,183,359; R. Mülhaupt et al. "Novel Polypropylene Materials Derived from Vinylidene-terminated Oligopropenes" in 4 POLYMER FOR ADVANCED TECHNOLOGY pp. 439-449 (1993); R. Mülhaupt et al. "Reactive Blending of Polypropylene/Polyamide-6 in the Presence of Tailor made Succinic Anhydride-terminated Oligopropene Compatabilizers" in 4 POLYMER FOR ADVANCED TECHNOLOGY pp. 465-474 (1993); A. S. Sainath "Synthesis and Characteristics of Succinic Anhydride- and Disodium Succinate-Terminated Low Molecular Weight Polyethylenes", 42(13) MACROMOLECULES 4356-4358 (2009); and M. Thompson et al. "Terminal Functionalization of Polypropylene via the Alder Ene Reaction", in 39(2) POLYMER 327-334 (1998).

SUMMARY

The invention disclosed herein is directed to a method of functionalizing a vinyl terminated polyolefin, an unexpectedly slow and inefficient reaction, the method comprising combining (meaning, as one of skill in the art would understand, contacting under conditions sufficient to effect a desired chemical reaction, or "reacting") a vinyl terminated polyolefin and a α,β-unsaturated carbonyl compound at a temperature of at least 150° C. but as high as 250° C. or more, and a pressure of at least 14 psi, but as high as 200 or 300 psi or more, thereby forming a functionalized polyolefin. Preferably, the functionalized polyolefin comprises a compound or mixture of compounds represented by one or more of the following formulae:

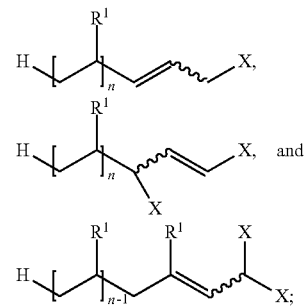

wherein each $R^1$ is, independently, selected from hydrogen and $C_1$ to $C_4$ or $C_{10}$ alkyls; n is an integer from 2 or 20 to 500 or 800; and each X is, independently, a functional group derived from the α,β-unsaturated carbonyl compound.

DETAILED DESCRIPTION

The inventors have found an improved methodology of functionalizing vinyl terminated polyolefins with α,β-unsaturated carbonyl compounds. By raising the reaction temperature, reaction pressure, or both, the overall yield and rate of reaction improves and the reaction time to get a high rate of functionalization decreases. The functionalization method disclosed can be applied to vinyl terminated polyolefins (or "VTPs") with different molecular weight, molecular weight distribution (e.g., a MWD from 1.0 to 1.5 for atactic propylene oligomer distilled fractions) and backbone molecular composition ($C_2$ only, $C_3$ only, $C_3C_2$, $C_3C_4$, $C_3C_5$, $C_3C_6$, $C_3C_8$, $C_3C_{10}$, etc.) including crystallizable and amorphous substrates. An example of α,β-unsaturated carbonyl functionalization is maleation of atactic polypropylene bottoms (residual liquid from distillation of low Mn aPP oligomer sample) such as demonstrated herein (e.g., example 10). There, the aPP starting material has a low polydispersity (Mw/Mn) of 1.20, which on maleation, gave an anhydride functionalized material with Mw/Mn=1.27.

Thus, the invention is directed to efficient functionalization of VTPs with one or multiple α,β-unsaturated carbonyl compounds, or anhydride groups by maleation (also known as Alder-ene reaction), of terminal C=C bond, and derivatization of the resulting anhydride functionalities. A common scheme for such reactions is shown (where "x" is 0 or an integer from 1 to 10 or 20; "n" is an integer from 2 to 800):

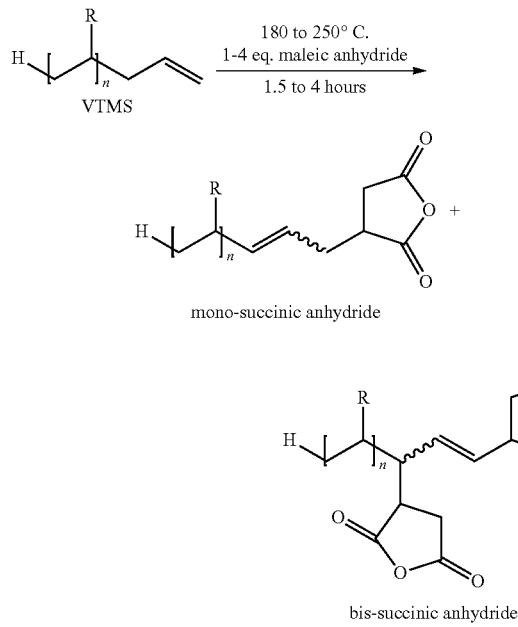

R = CH$_3$ (polypropylene)
R = CH$_3$ or H (ethylene-propylene)
R = CH$_3$ or C$_x$H$_{2x-1}$ (propylene-α-olefin)

The resulting anhydride functionalities can be used for reacting with nucleophilic reagents including polyethyleneamines with general molecular formula H$_2$N(CH$_2$CH$_2$NH)$_x$H (where x=1, 2, 3, . . . ) such as diethylenetriamine (DETA), triethylenetetramine (TETA), tetraethylenepentamine (TEPA), pentaethylenehexamine (PEHA), hexaethyleneheptamine or polyethyleneamine heavy bottoms. Other types of nucleophilic reagents can also be used, including, for example, monoamines, diamines, amino alcohols, polyetheramines, Jeffamine™, polyols (e.g., pentaerythritol), polyalkylene glycols (PAG), polyalkylene polyamine, and the like. The polyolefin anhydride itself may be used to prepare the corresponding succinic acid and the corresponding alkali/alkaline salts for application such as surfactants. The functionalized derivatives may also find extensive uses as dispersants in lubricating oils, antifoulant dispersants for heavy hydrocarbon refinery streams, as well as dispersants for polar inorganic and organic particulates, just to name a few.

Vinyl-Terminated Polyolefin (VTP)

The vinyl terminated polyolefins useful in the inventive method of functionalizing a vinyl terminated polyolefin with one or more α,β-unsaturated carbonyl compounds can be made in any number of ways. Preferably, the VTP's useful herein are polymers as first described in US 2009-0318644 (referred to therein as vinyl terminated "macromers" or "macromonomers") having at least one terminus (CH$_2$CH—CH$_2$-oligomer or polymer) represented by formula (I):

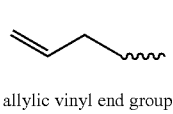

allylic vinyl end group where the "~~~" represents the oligomer or polymer chain. Preferably, the allyl chain ends are represented by the formula (II):

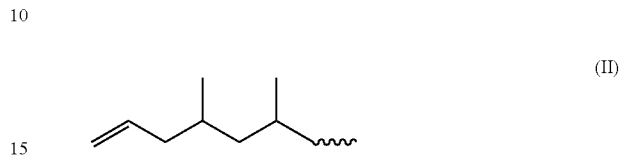

The amount of allyl chain ends is determined using $^1$H NMR at 120° C. using deuterated tetrachloroethane as the solvent on a 500 MHz machine, and in selected cases confirmed by $^{13}$C NMR. These groups (I) and (II) will react to form a chemical bond with a metal, as mentioned above, to form the M-CH$_2$CH$_2$-polymer. In any case, Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114 J. AM. CHEM. SOC. pp. 1025-1032 (1992) that are useful herein.

The vinyl-terminated propylene-based polymers may also contain an isobutyl chain end. "Isobutyl chain end" is defined to be an oligomer having at least one terminus represented by the formula (III):

Preferably, the isobutyl chain end is represented by one of the following formulae (IV):

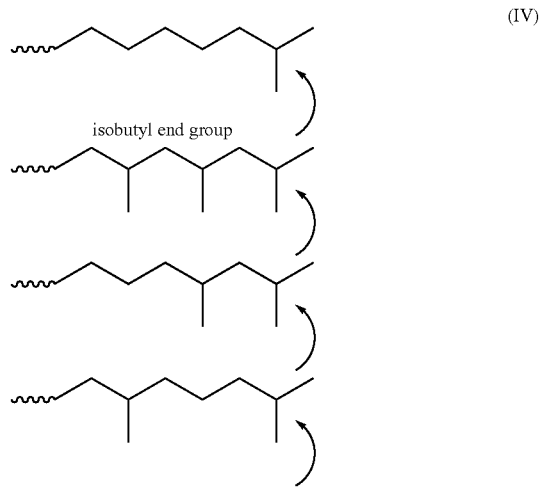

The percentage of isobutyl end groups is determined using $^{13}$C NMR (as described in the example section) and the chemical shift assignments in *Resconi* for 100% propylene oligomers. Preferably, the vinyl-terminated polymers described herein have an allylic terminus, and at the opposite end of the polymer an isobutyl terminus.

The VTPs can be made by any suitable means, but most preferably the VTPs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 Å$^3$) perfluorinated boron activator, for example as described in US 2012-0245299.

The vinyl terminated polyolefin can be any polyolefin having a vinyl-terminal group, and is preferably selected from the group consisting of vinyl-terminated isotactic polypropylenes, atactic polypropylenes, syndiotactic polypropylenes, propylene-butene copolymers, propylene-hexene copolymers, and propylene-ethylene copolymers (wherein the copolymers may be random, elastomeric, impact and/or block), and combinations thereof, each having a number average molecular weight (Mn) of at least 300 g/mole. Preferably, greater than 90 or 94 or 96% of the polyolefin comprises terminal vinyl groups; or within the range of from 50 or 60 wt % to 70 or 80 or 90 or 95 or 98 or 99%. As described above, the vinyl terminated polyolefins preferably have a Mn value of at least 200 or 400 or 1000 or 5000 or 20,000 g/mole, or within the range of from 200 or 400 or 500 g/mole to 20,000 or 30,000 or 40,000 or 50,000 or 100,000 or 200,000 or 300,000 g/mole. The vinyl terminated polyolefins preferably have a weight average molecular weight (Mw) value of at least 500 or 800 or 1000 or 5000 or 20,000 g/mole, or within the range of from 500 or 800 or 1000 or 2000 g/mole to 6,000 or 10,000 or 12,000 or 20,000 or 30,000 or 40,000 or 50,000 or 100,000 or 200,000 or 300,000 g/mole. Preferably, the VTP useful herein is amorphous polypropylene, and desirably has a glass transition temperature (Tg) of less than 10 or 5 or 0° C., more preferably less than −10° C.; or within the range of from 0 or −5 or −10° C. to −30 or −40 or −50° C. or as described herein. The VTPs are preferably linear, meaning that there is no polymeric or oligomeric branching from the polymer backbone, or described quantitatively, having a branching index "g" (or g'$_{(vis\ avg)}$) of at least 0.90 or 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in US 2013-0090433.

A particularly preferred VTP is one wherein the vinyl terminated polyolefin is a compound or mixture of compounds represented by the formula (V):

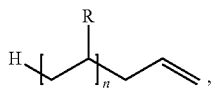

(V)

wherein each R is selected from hydrogen and $C_1$ to $C_4$ or $C_{10}$ alkyls; and n is an integer from 2 or 4 or 10 or 20 to 50 or 100 or 200 or 500 or 800.

Inventive Process

Thus, disclosed herein is a method of functionalizing a vinyl terminated polyolefin, the method comprising, or consisting essentially of, combining a VTP and a α,β-unsaturated carbonyl compound at a temperature of at least 150 or 160 or 180 or 200 or 220 or 240 or 250° C. and a pressure of at least 14 or 20 or 50 or 100 or 200 or 300 or 400 psi, forming a functionalized polyolefin. More preferably, the reaction is conducted at a temperature within the range of from 190 or 200 or 220° C. to 260 or 280 or 300 or 320° C. Also, the preferred pressure range may be within the range from 80 or 100 or 120 psi to 300 or 350 or 400 or 500 psi. By "consisting essentially of" what is meant is that no other major reactants are present to effect the identity of the final functionalized polyolefin product to no more than 3 wt % of the total product.

Preferably, α,β-unsaturated carbonyl compound is an unsaturated anhydride. Even more preferably, the α,β-unsaturated carbonyl compound is a compound or mixture of compounds represented by one or more of the formulae (VI):

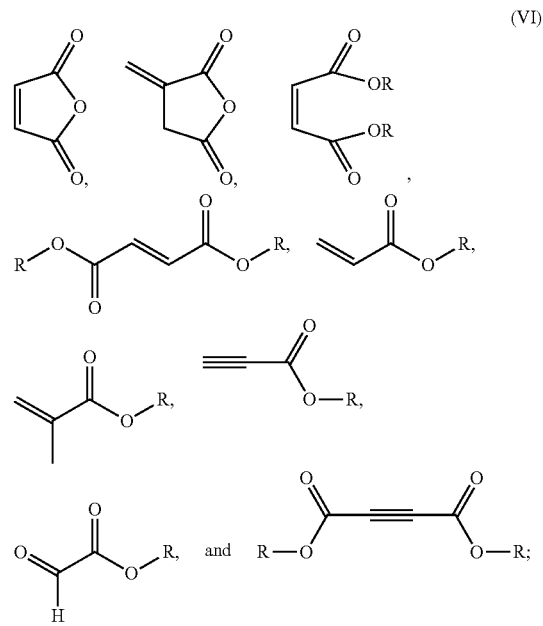

(VI)

wherein each R is, independently, a hydrogen or a $C_1$ to $C_{10}$ or $C_{20}$ alkyls (linear or branched), or mixture thereof. Most preferably, the α,β-unsaturated carbonyl compound is maleic anhydride or a $C_1$ to $C_5$ alkyl substituted version thereof, the structures not being limited to the cis- or trans-isomers thereof.

Desirably, the combining takes place using neat carbonyl compound and/or VTP, where the VTP may be molten if not a liquid at the desired reaction temperature. However, the carbonyl compound and VTP can be mixed with or without added solvent. Regardless, the carbonyl compound and VTP are mixed for a period within the range from a few minutes or 10 minutes or 30 minutes or 1 hour or 2 hours or 3 hours to 4 or 6 or 8 or 10 or 16 or 24 hours. Preferably, from 0.8 or 1.0 to 1.5 or 2.0 or 3.0 or 4.0 or 5.0 or 6.0 equivalents of the α,β-unsaturated carbonyl compound are added per equivalent of VTP. The combining preferably takes place in an inert atmosphere such as under nitrogen, most preferably to the exclusion of oxygen and/or water vapor. In any case, preferably, the combining takes place such that the resulting product of the combining, the functionalized polyolefin, has at least 0.3 or 0.5 or 0.6 or 0.8 or 0.9 or 1.0 or 1.1 functional groups per polyolefin chain; or within a range of from 0.3 or 0.5 or 0.8 or 0.9 to 1.3 or 1.4 or 1.6 or 1.8 or 2.0 or 2.5 or 3.0 functional groups per polyolefin chain.

It is possible to also combine with the VTP and carbonyl compound one or more Lewis Acids selected from the group consisting of titanium halides, titanium alkyls and alkoxys, tin halides, tin alkyls and alkoxys, aluminum halides, aluminum alkyls and alkoxys, boron halides, boron alkyls and alkoxys, zinc halides, and combinations thereof; preferably, wherein the Lewis Acid is selected from the group consisting of $SnCl_4$, $AlCl_3$, $Me_2AlCl$, $EtAlCl_2$, $Et_2AlCl$, $TiCl_4$, $TiCl_2(i\text{-}PrO)_2$, $TiBr_2(i\text{-}PrO)_2$, $BF_3$ and mixtures thereof (where "Me" is methyl, "Et" is ethyl, and "i-Pr" is isopropyl). When a Lewis Acid is also combined, the temperature of combining is desirably lowered relative to when no Lewis Acid is combined, preferably within the range of from 0 or 10 or 20° C. to 20 or 30 or 50 or 60° C.

Described more particularly, the inventive functionalized polyolefin is preferably a compound or mixture of compounds represented by one or more of the formulae (VII):

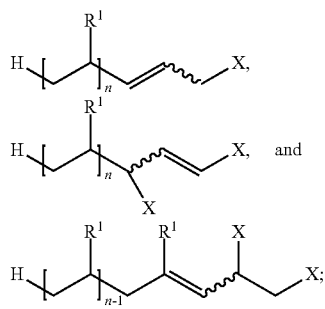

wherein each $R^1$ is, independently, selected from hydrogen or $C_1$ to $C_4$ or $C_{10}$ alkyls; n is an integer from 2 or 4 or 10 or 20 or 50 or 100 or 200 or 500 or 800; and each X is, independently, a functional group derived from the α,β-unsaturated carbonyl compound. The most preferred functionalized polyolefin is a mono- or bis-succinic anhydride, or mixture thereof. The inventive functionalized polyolefin may be made by the inventive method described herein or any other desirable method.

The functionalized polyolefin may have any number of uses, such as fouling inhibitors or mitigators, or as additives in lubricant oils, or as additives in rubber/elastomeric compositions such as in tire treads to compatabilize the components therein.

The various descriptive elements and numerical ranges disclosed herein for the inventive method and polymer compositions can be combined with other descriptive elements and numerical ranges to describe the method and polymer compositions therefrom; further, for a given element, any upper numerical limit can be combined with any lower numerical limit described herein. The features of the invention are demonstrated in the following non-limiting examples.

EXAMPLES

Unless otherwise stated, Mn (GPC) was determined using the GPC-DRI method described below. Mn, Mw, and Mz may be measured by using a Gel Permeation Chromatography (GPC) method using a High Temperature Size Exclusion Chromatograph (SEC, either from Waters Corporation or Polymer Laboratories), equipped with a differential refractive index detector (DRI). Molecular weight distribution (MWD) is Mw (GPC)/Mn (GPC). Experimental details, are described in T. Sun et al. in 34(19) MACROMOLECULES pp. 6812-6820 (2001) and references therein. Three Polymer Laboratories PLgel 10 mm Mixed-B columns are used. The nominal flow rate is 0.5 cm³/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at 25° C. and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto, (dn/dc)=0.104 for propylene polymers and ethylene polymers, and 0.1 otherwise. Units of parameters used throughout this description of the SEC method are: concentration is expressed in g/cm³, molecular weight is expressed in g/mol, and intrinsic viscosity is expressed in dL/g.

Example 1. Maleation of Commercial Highly Reactive Polyisobutylene (HR-PIB)

To a two-neck 500 ml round-bottomed flask equipped with a $N_2$ inlet and a $N_2$ outlet was added highly reactive polyisobutylene (HR-PIB, TPC 5 from Texas Petrochemicals) (Mn 750 g/mol, 75 g, 100.00 mmol) followed by maleic anhydride (15.69 g, 160.00 mmol, 1.60 equiv) at room temperature (hereinafter 25° C.). The mixture was flushed with nitrogen for 10 min at room temperature and the mixture was heated to 190° C. (oil bath) for 7.25 hours under a nitrogen atmosphere and the mixture was allowed to cool to room temperature. The mixture was cooled to room temperature, diluted with hexanes (200 ml), filtered and concentrated on a rotary evaporator. Excess maleic anhydride was removed by heating at 95-100° C. under high vacuum for 4 fours to afford a light brown viscous oil as product (83.56 g). Elemental analyses for this polyisobutylene succinic anhydride found C: 81.30%, H: 13.36%. The oxygen content of this material is estimated to be about 5.34 wt % by difference. The anhydride content of this polymer material is estimated to be about 1.113 mmol/g. Based on the molecular weight of polymer starting material, there is about 1.11 succinic anhydride functionality per polymer chain.

Example 2. Maleation of Vinyl-Terminated Atactic Polypropylene

To a two-neck 500 ml round-bottomed flask equipped with a $N_2$ inlet and a $N_2$ outlet was added vinyl-terminated atactic polypropylene (GPC Mw 5646, Mn 1474, $^1$H NMR Mn 1190.19 g/mol, 75.00 g, 63.02 mmol) followed by maleic anhydride (15.45 g, 157.56 mmol) at room temperature. The mixture was flushed with nitrogen for 10 min at room temperature and the mixture was heated to 190° C. (oil bath) for 63.5 hours under a nitrogen atmosphere. Additional maleic anhydride (3.10 g, 31.61 mmol) was added to the mixture that had been cooled to about 120° C. and heating was continued at 190° C. (oil bath) for an additional 17 hours under a nitrogen atmosphere. The mixture was cooled to room temperature, diluted with hexanes, filtered and concentrated on a rotary evaporator. Excess maleic anhydride was removed by heating at 95-100° C. under high vacuum to afford a light brown viscous oily product (85.70 g). GPC Mw 4020, Mn 1413. Elemental analyses for this polypropylene succinic anhydride found C: 80.79%, H: 12.51%. The oxygen content of this material is estimated to be about 6.70 wt % by difference. The anhydride content of this polymer material is estimated to be about 1.396 mmol/g. Based on the molecular weight of polymer starting material, there is about 1.93 succinic anhydride functionality per polymer chain.

Example 3. Maleation of Vinyl-Terminated Atactic Polypropylene

To a two-neck 500 ml round-bottomed flask equipped with a $N_2$ inlet and a $N_2$ outlet was added vinyl-terminated PP (Mn 2264.48 g/mol, 175.00 g, 77.28 mmol) followed by maleic anhydride (22.74 g, 231.90 mmol, 3.0 equiv) at room temperature. The mixture was flushed with nitrogen for 10 min at room temperature and mixture was heated to 190° C. (oil bath) for 70.75 hours under a nitrogen atmosphere. The mixture was allowed to cool to room temperature, diluted with hexanes, filtered and concentrated on a rotary evaporator. Excess maleic anhydride was removed by heating at 95-100° C. under high vacuum for 5 hours to afford a light brown viscous oil as product (182.2 g). Elemental analyses for this polyisobutylene succinic anhydride found C: 83.50%, H: 13.68%. The oxygen content of this material is estimated to be about 2.82 wt % by difference. The anhydride content of this polymer material is estimated to be about 0.588 mmol/g. Based on the molecular weight of polymer starting material, there is about 1.41 succinic anhydride functionality per polymer chain.

Example 4. Maleation of Vinyl-Terminated Propylene/1-Hexene Copolymer

To a two-neck 500 ml round-bottomed flask equipped with a $N_2$ inlet and a $N_2$ outlet was added vinyl-terminated $C_3/C_6$ copolymer (Mn 1668.96 g/mol, 150 g, 89.88 mmol) followed by maleic anhydride (24.24 g, 247.20 mmol, 2.75 equiv) at room temperature. The mixture was flushed with nitrogen for 10 min at room temperature and mixture was heated to 190° C. (oil bath) for 99 hours under a nitrogen atmosphere. The mixture was allowed to cool to room temperature, diluted with hexanes, filtered and concentrated on a rotary evaporator. The mixture was heated at 95-100° C. under high vacuum for 5 hours to afford a light brown viscous oil as product (165.4 g). Elemental analyses for this polyisobutylene succinic anhydride found C: 82.80%, H: 13.21%. The oxygen content of this material is estimated to be about 3.99 wt % by difference. The anhydride content of this polymer material is estimated to be about 0.831 mmol/g. Based on the molecular weight of polymer starting material, there is about 1.51 succinic anhydride functionality per polymer chain.

Example 5. Maleation of Vinyl-Terminated Propylene/1-Butene Copolymer

To a two-neck 250 ml round-bottomed flask equipped with a $N_2$ inlet and a $N_2$ outlet was added vinyl-terminated $C_3/C_4$ copolymer (Mn 1062.16 g/mol, 50 g, 47.07 mmol) followed by maleic anhydride (9.23 g, 94.13 mmol, 2.0 equiv) at room temperature and mixture was heated to 190° C. (oil bath) for 84.5 hours under a nitrogen atmosphere. The mixture was allowed to cool to room temperature, diluted with hexanes, filtered and concentrated on a rotary evaporator. The mixture was heated at 95-100° C. under high vacuum for 5 hours to afford a light brown viscous oil as product (54.97 g). Elemental analyses for this polyisobutylene succinic anhydride found C: 81.76%, H: 13.09%. The oxygen content of this material is estimated to be about 5.15 wt % by difference. The anhydride content of this polymer material is estimated to be about 1.073 mmol/g. Based on the molecular weight of polymer starting material, there is about 1.27 succinic anhydride functionality per polymer chain.

Example 6. Maleation of Vinyl-Terminated Atactic Polypropylene

To a 300 ml stainless steel autoclave equipped with a mechanical stirrer and $N_2$ inlet and a $N_2$ outlet was added vinyl-terminated PP (Mn 1015.76 g/mol, 50 g, 49.22 mmol) followed by maleic anhydride (9.66 g, 98.51 mmol, 2.00 equiv) at room temperature. The mixture was stirred and flushed three times with nitrogen at room temperature and pressurized to about 80-85 psi. The mixture was heated to 200° C. for 2 hr at about 125-130 psi and allowed to cool to room temperature. The pressure was released slowly and the autoclave was opened. The mixture was diluted with hexanes, filtered under house vacuum and the filtrate was concentrated on a rotary evaporator. Excess maleic anhydride was removed by heating at 95° C. under high vacuum to afford a light yellow viscous oily product (49.4 g). Elemental analyses for this polypropylene succinic anhydride found C: 84.87%, H: 14.16%. The oxygen content of this material is estimated to be about 0.97 wt % by difference. The anhydride content of this copolymer material is estimated to be about 0.202 mmol/g. Based on the molecular weight of polymer starting material, there is about 0.21 succinic anhydride functionality per polymer chain.

Example 7. Maleation of Vinyl-Terminated Atactic Polypropylene

To a 300 ml stainless steel autoclave equipped with a mechanical stirrer and $N_2$ inlet and a $N_2$ outlet was added vinyl-terminated PP (Mn 1015.76 g/mol, 50 g, 49.22 mmol) followed by maleic anhydride (9.66 g, 98.51 mmol, 2.00 equiv) at room temperature. The mixture was stirred and flushed three times with nitrogen at room temperature and pressurized to about 80-85 psi. The mixture was heated to 225° C. for 2 hr at about 125-130 psi and allowed to cool to room temperature. The pressure was released slowly and autoclave was opened. The mixture was diluted with hexanes, filtered under house vacuum and the filtrate was concentrated on a rotary evaporator. Excess maleic anhydride was removed by heating at 95° C. under high vacuum to afford a light brown viscous oily product (51.12 g).

Elemental analyses for this polypropylene succinic anhydride found C: 83.26%, H: 13.43%. The oxygen content of this material is estimated to be about 3.31 wt % by difference. The anhydride content of this copolymer material is estimated to be about 0.690 mmol/g. Based on the molecular weight of polymer starting material, there is about 0.751 succinic anhydride functionality per polymer chain.

Example 8. Maleation of Vinyl-Terminated Atactic Polypropylene

To a 300 ml stainless steel autoclave equipped with a mechanical stirrer and $N_2$ inlet and a $N_2$ outlet was added vinyl-terminated PP (Mn 1015.76 g/mol, 90 g, 88.60 mmol) followed by maleic anhydride (17.38 g, 177.24 mmol, 2.0 equiv) at room temperature. The mixture was stirred and flushed three times with nitrogen at room temperature and pressurized to about 80-85 psi. The mixture was heated to 250° C. for 3 hr about 125-130 psi and allowed to cool to room temperature. The pressure was released slowly and autoclave was opened. The mixture was diluted with hexanes, filtered under house vacuum and the filtrate was concentrated on a rotary evaporator. Excess maleic anhydride was removed by heating at 95° C. under high vacuum to afford a light brown viscous oily product. Elemental analyses for this polypropylene succinic anhydride found C: 81.24%, H: 12.84%. The oxygen content of this material is estimated to be about 5.92 wt % by difference. The anhydride content of this copolymer material is estimated to be about 1.233 mmol/g. Based on the molecular weight of polymer starting material, there is about 1.425 succinic anhydride functionality per polymer chain.

Example 9. Maleation of Vinyl-Terminated Atactic Polypropylene

To a 300 ml stainless steel autoclave equipped with a mechanical stirrer and $N_2$ inlet and a $N_2$ outlet was added vinyl-terminated PP (Mn 1865.85 g/mol, 90 g, 48.24 mmol) followed by maleic anhydride (18.92 g, 192.94 mmol, 4.0 equiv) at room temperature. The mixture was stirred and flushed three times with nitrogen at room temperature and pressurized to 300 psi. The mixture was heated to 250° C. for 3 hr and allowed to cool to room temperature. The pressure was released slowly and autoclave was opened. The mixture was diluted with hexanes, filtered under house vacuum and the filtrate was concentrated on a rotary evaporator. Excess maleic anhydride was removed by heating at 95° C. under high vacuum to afford a light brown viscous oily product (93.3 g). Elemental analyses for this polypropylene succinic anhydride found C: 82.41%, H: 13.31%. The oxygen content of this material is estimated to be about 4.28 wt % by difference. The anhydride content of this copolymer material is estimated to be about 0.892 mmol/g. Based on the molecular weight of polymer starting material, there is about 1.823 succinic anhydride functionality per polymer chain.

Example 10. Maleation of Vinyl-Terminated Atactic Polypropylene with Low Polydispersity (Mw/Mn=1.20)

To a 300 ml stainless steel autoclave equipped with a mechanical stirrer and $N_2$ inlet and a $N_2$ outlet was added vinyl-terminated PP (Mn 1312.25 g/mol, 50 g, 38.10 mmol) followed by maleic anhydride (7.47 g, 76.18 mmol, 2.00 equiv) at room temperature. The mixture was stirred and flushed three times with nitrogen at room temperature and pressurized to about 80-85 psi. The mixture was heated to 250° C. for 3 hr at about 125-130 psi and allowed to cool to room temperature. The pressure was released slowly and autoclave was opened. The mixture was diluted with hexanes, filtered under house vacuum and the filtrate was concentrated on a rotary evaporator. Excess maleic anhydride was removed by heating at 95° C. under high vacuum to afford a light brown viscous oily product (53.1 g). Elemental analyses for this polypropylene succinic anhydride found C: 82.67%, H: 13.58%. The oxygen content of this material is estimated to be about 3.75 wt % by difference. The anhydride content of this copolymer material is estimated to be about 0.781 mmol/g. Based on the molecular weight of polymer starting material, there is about 1.110 succinic anhydride functionality per polymer chain. The polydispersity of the PP-SA material is 1.27 as determined by GPC (THF, 40° C.).

The inventors have found that the maleation of aPP (Mn of about 1000 g/mol) at elevated temperature gave much improved conversion of the vinyl group, providing a material with average 0.75 succinic anhydride functionality per polymer after 2 hours at 225° C. when 2 equivalents of MA was used in autoclave (Example 7). When the reaction temperature was further raised to 250° C. and the reaction time extended to 3 hours, the functionalization has increased to 1.42 succinic anhydride functionality per polymer (Example 8). Further exemplification of the benefits of employing an elevated temperature in promoting the maleation of vinyl double bond are evident by comparing Example 9 or 10 (reaction time about 3 hours at 250° C. in autoclave) with Examples 2, 3, 4, 5 (reaction time between 70 to 99 hours at 190° C. in glassware).

Now, having described the various features of the inventive method of making a functionalized polyolefin and the functionalized polymer therefrom, disclosed here in numbered paragraphs is:

P1. A functionalized polyolefin comprising a compound or mixture of compounds represented by one or more of the following formulae:

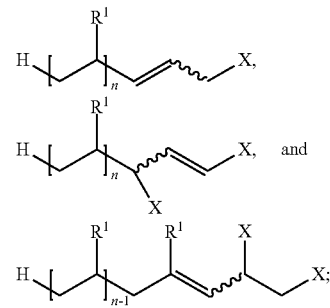

wherein each $R^1$ is, independently, selected from hydrogen or $C_1$ to $C_4$ or $C_{10}$ alkyls; n is an integer from 2 or 4 or 10 or 20 to 50 or 100 or 200 or 500 or 800; and each X is, independently, a functional group derived from the α,β-unsaturated carbonyl compound.

P2. A method of functionalizing a vinyl terminated polyolefin, the method comprising (or consisting essentially of) combining a vinyl terminated polyolefin and a α,β-unsaturated carbonyl compound at a temperature of at least 150 or 160 or 180 or 200 or 220 or 240 or 250° C. and a pressure of at least 14 or 20 or 50 or 100 or 200 or 300 or 400 psi, forming a functionalized polyolefin, preferably the functionalized polyolefin of paragraph 1.

P3. The method of numbered paragraph 2, wherein the α,β-unsaturated carbonyl compound is an unsaturated anhydride.

P4. The method of numbered paragraphs 2 or 3, wherein the α,β-unsaturated carbonyl compound is compound or mixture of compounds represented by one or more of the following formulae:

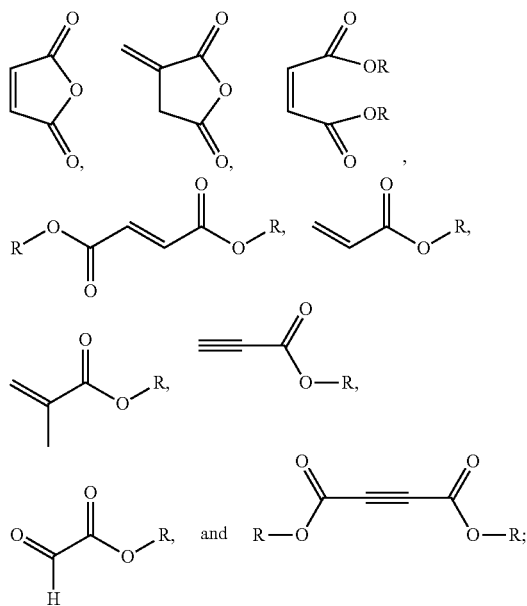

wherein each R is, independently, a hydrogen, a $C_1$ to $C_{10}$ or $C_{20}$ alkyls (linear or branched), or mixture thereof; preferably, the α,β-unsaturated carbonyl compound is maleic anhydride, the structures not being limited to the cis- or trans-isomers thereof.

P5. The method of any one of the previous numbered paragraphs, wherein the vinyl terminated polyolefin is compound or mixture of compounds represented the formula:

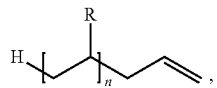

wherein R is selected from hydrogen and $C_1$ to $C_4$ or $C_{10}$ alkyls; and n is an integer from 2 or 4 or 10 or 20 to 50 or 100 or 200 or 500 or 800.

P6. The method of any one of the previous numbered paragraphs, wherein the vinyl terminated polyolefin has a number average molecular weight (Mn) within the range from 200 or 300 or 400 or 500 g/mole to 1000 or 2000 or 4000 or 10,000 or 15,000 or 20,000 or 30,000 g/mole.

P7. The method of any one of the previous numbered paragraphs, wherein the functionalized polyolefin has at least 0.3 or 0.5 or 0.6 or 0.8 or 0.9 or 1.0 or 1.1 functional groups per polyolefin chain; or within a range of from 0.3 or 0.5 or 0.8 or 0.9 to 1.3 or 1.4 or 1.6 or 1.8 or 2.0 or 2.5 or 3.0 functional groups per polyolefin chain.

P8. The method of any one of the previous numbered paragraphs, wherein the combining takes place in a period within the range from a few minutes or 10 minutes or 30 minutes or 1 hour or 2 hours or 3 hours to 4 or 6 or 8 or 10 or 16 or 24 hours.

P9. The method of any one of the previous numbered paragraphs, wherein the combining takes place in the presence of a Lewis Acid selected from the group consisting of titanium halides, titanium alkyls and alkoxys, tin halides, tin alkyls and alkoxys, aluminum halides, aluminum alkyls and alkoxys, boron halides, boron alkyls and alkoxys, zinc halides, and combinations thereof; more preferably, wherein the Lewis Acid is selected from the group consisting of $SnCl_4$, $AlCl_3$, $Me_2AlCl$, $EtAlCl_2$, $Et_2AlCl$, $TiCl_4$, $TiCl_2(i\text{-}PrO)_2$, $TiBr_2(i\text{-}PrO)_2$, $BF_3$ and mixtures thereof (where "Me" is methyl, "Et" is ethyl, and "i-Pr" is isopropyl).

P10. The method of numbered paragraph 9, wherein the temperature of combining is within the range of from 0 or 10 or 20° C. to 20 or 30 or 50 or 60° C.

P11. The method of any one of the previous numbered paragraphs, wherein the functionalized polyolefin is a compound or mixture of compounds represented the one or more of the following formulae:

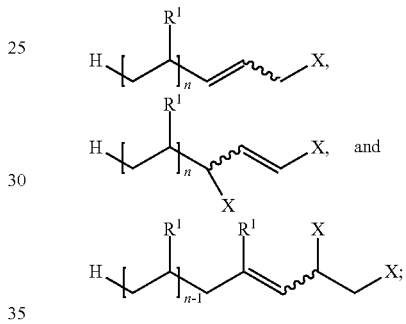

wherein each $R^1$ is, independently, selected from hydrogen or $C_1$ to $C_4$ or $C_{10}$ alkyls; n is an integer from 2 or 4 or 10 or 20 or 50 or 100 or 200 or 500 or 800; and each X is, independently, a functional group derived from the α,β-unsaturated carbonyl compound.

P12. The method of any one of the previous numbered paragraphs, wherein the combining takes place in an inert atmosphere.

P13. The method of any one of the previous numbered paragraphs, wherein from 0.8 or 1.0 to 1.5 or 2.0 or 3.0 or 4.0 or 5.0 or 6.0 equivalents of the α,β-unsaturated carbonyl compound are added per equivalent of VTP.

P14. A functionalized polyolefin made by the method of any one of the previous numbered paragraphs.

Also described is the use of a vinyl terminated polyolefin in a reaction with at least one α,β-unsaturated carbonyl compound as these components are described herein. Also described is the use of the inventive functionalized polyolefin as a fouling mitigator, or compatabilizer in elastomeric or lubricant compositions.

All patents and patent applications, test procedures and other documents cited herein are fully incorporated by reference to the extent such disclosure is not inconsistent with this invention and for all jurisdictions in which such incorporation is permitted.

The invention claimed is:

1. A method of functionalizing a vinyl terminated polyolefin, the method comprising combining a vinyl terminated polyolefin and a α,β-unsaturated carbonyl compound at a temperature of at least 150° C. and a pressure of at least 14 psi, forming the functionalized polyolefin, wherein the α,β-unsaturated carbonyl compound is compound or mixture of compounds represented by one or more of the following formulae:

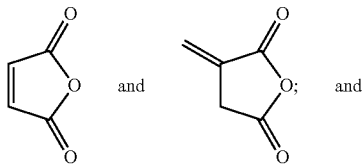

wherein the functionalized polyolefin is a compound or mixture of compounds represented the one or more of the following formulae:

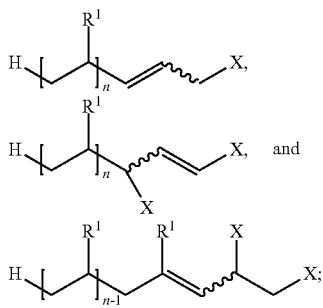

wherein each $R^1$ is, independently, selected from hydrogen or $C_1$ to $C_{10}$ alkyls; n is an integer from 2 to 800; and each X is, independently, a functional group derived from the α,β-unsaturated carbonyl compound.

2. The method of claim 1, wherein the vinyl terminated polyolefin is compound or mixture of compounds represented the formula:

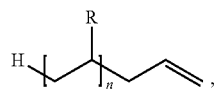

wherein R is selected from hydrogen and $C_1$ to $C_4$ or $C_{10}$ alkyls; and n is an integer from 2 or to 800.

3. The method of claim 1, wherein the vinyl terminated polyolefin has a number average molecular weight (Mn) within the range from 200 g/mole to 30,000 g/mole.

4. The method of claim 1, wherein the functionalized polyolefin has at least 0.3 functional groups per polyolefin chain.

5. The method of claim 1, wherein the combining takes place in a period within the range from a few minutes or 10 minutes to 24 hours.

6. The method of claim 1, wherein the combining takes place in the presence of a Lewis Acid selected from the group consisting of titanium halides, titanium alkyls and alkoxys, tin halides, tin alkyls and alkoxys, aluminum halides, aluminum alkyls and alkoxys, boron halides, boron alkyls and alkoxys, zinc halides, and combinations thereof.

7. The method of claim 6, wherein the temperature of combining is within the range of from 0° C. to 60° C.

8. The method of claim 1, wherein the combining takes place in an inert atmosphere.

9. The method of claim 1, wherein from 0.8 to 6.0 equivalents of the α,β-unsaturated carbonyl compound are added per equivalent of VTP.

* * * * *